July 23, 1963
E. E. REESE
3,098,255
WINDSHIELD WIPER BLADE
Filed April 8, 1960
2 Sheets-Sheet 1
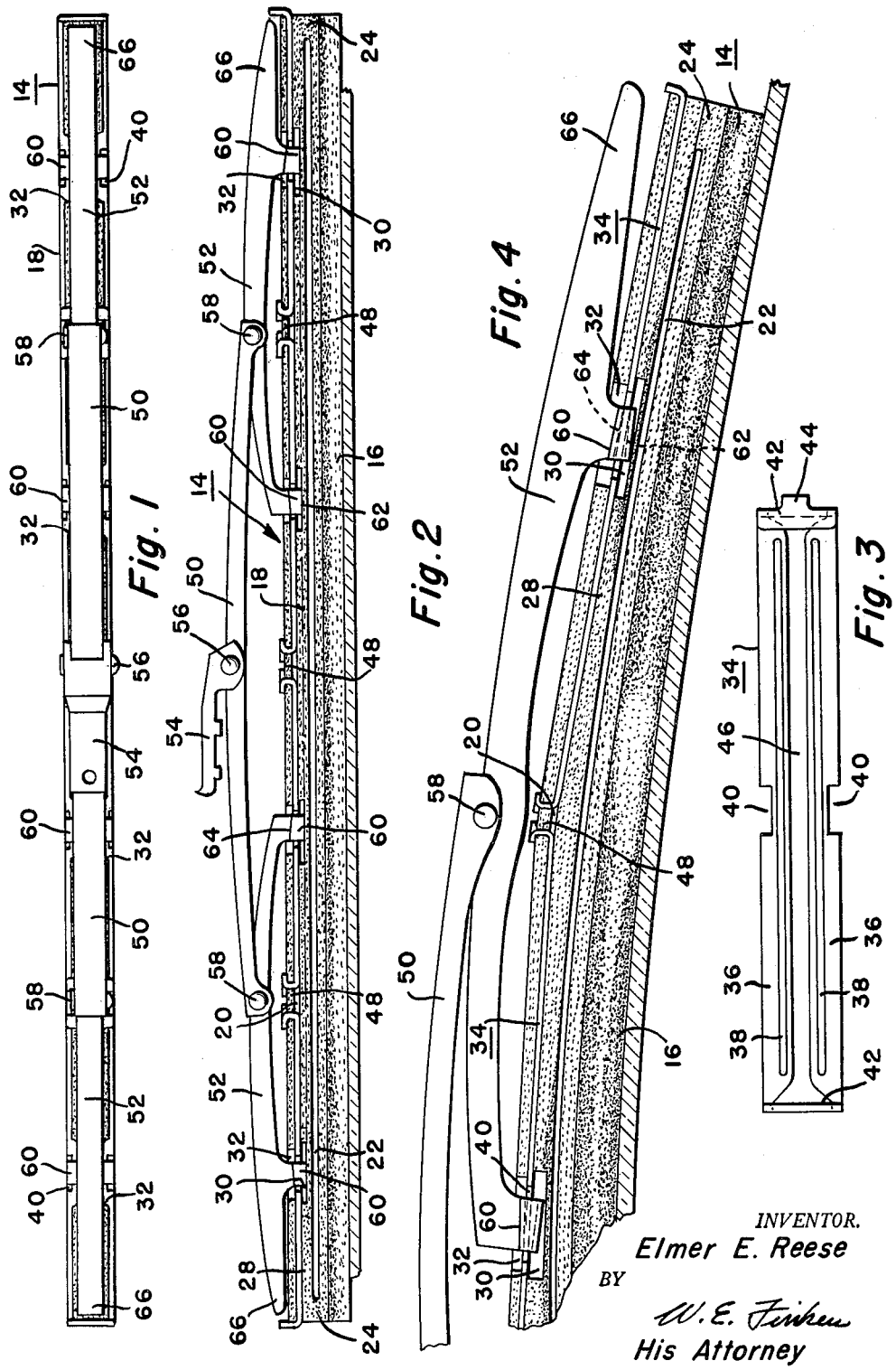
INVENTOR.
Elmer E. Reese
BY
W. E. Finken
His Attorney

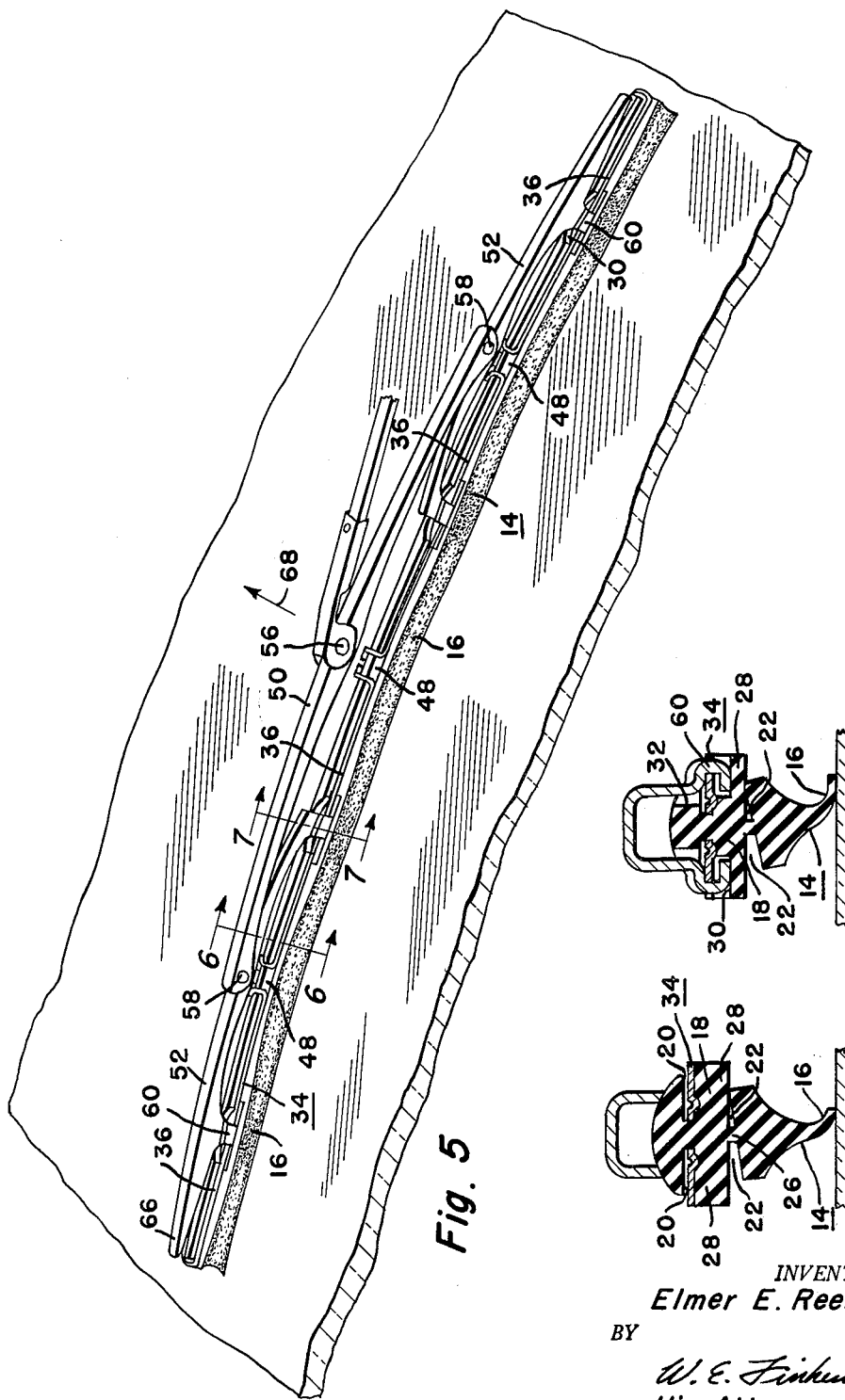

United States Patent Office 3,098,255
Patented July 23, 1963

3,098,255
WINDSHIELD WIPER BLADE
Elmer E. Reese, Rochester, N.Y., assignor to General Motors Corporation, Detroit, Mich., a corporation of Delaware
Filed Apr. 8, 1960, Ser. No. 21,005
2 Claims. (Cl. 15—250.42)

This invention pertains to windshield wiper blades, and particularly to a wiper blade capable of wiping either a flat surface or a surface having convex curvature.

A windshield wiper blade adapted to wipe flat and/or convexly curved surfaces including a plurality of spaced apart backing strips which are connected with a pressure applying superstructure so as to be incapable of flexing to conform to a convexly curved surface is disclosed in copending application Serial No. 829,250 filed July 24, 1959, now Patent #3,060,480, in the name of Eugene R. Ziegler and assigned to the assignee of this invention. This invention relates to an improved wiper blade assembly of the general type disclosed in the aforementioned application having means for minimizing flexure of the backing strips in a direction opposed to conformance with a convexly curved surface; means enabling tilting of the backing strips relative to the pressure applying superstructure to enable the several backing strips to lie in planes substantially tangent to segments of a convexly curved surface; and means for protecting and concealing the outer portions of the squeegee unit.

Accordingly, among my objects are the provision of a wiper blade assembly designed for wiping flat and/or convexly curved surfaces including means for applying wiper arm pressure substantially uniformly to spaced apart lengths of a squeegee; the further provision of a windshield wiper blade assembly having a pressure applying superstructure comprising a plurality of relatively movable pressure applying members and a squeegee unit comprising a squeegee and a plurality of spaced apart backing strips including connection means between each pressure applying member and each backing strip permitting limited tilting movement of the backing strips about a transverse axis; the further provision of a windshield wiper blade assembly of the aforesaid type including reinforced substantially flat skeletonized backing strips designed to resist appreciable flexing in a direction opposed to conformance to a convexly curved surface; and the still further provision of a pressure applying superstructure for a wiper blade assembly of the aforesaid type including integral extension means for concealing and protecting the outer portions of the squeegee unit.

The aforementioned and other objects are accomplished in the present invention by loosely connecting the backing strips with the pressure applying superstructure and providing integral extensions on the outer end portions of the secondary pressure distributing members of the pressure applying superstructure. Specifically, the wiper blade assembly disclosed herein comprises an elongate elastomeric squeegee having a wiping lip along one edge and a retention portion along the opposite edge. The retention portion is formed with a pair of grooves which extend longitudinally throughout the length of the squeegee element for receiving the side rails of four skeletonized backing strips. In addition, the squeegee element is formed with a pair of longitudinally extending flexure grooves spaced between the retention portion and the wiping lip, which grooves terminate short of the ends of the squeegee unit and facilitate lateral movement of the wiping lip relative to the retention portion to enable the wiping lip to assume the proper drag, or squeeging, position when moved across a windshield.

The backing strips are made from spring tempered stainless steel and comprise a pair of side rails of uniform cross-sectional area, each side rail having a reinforcing rib terminating short of the ends thereof. The side rails are joined at each end by a cross-strap, and the medial portion of each side rail is formed with a notch constituting a seat for the end of a secondary pressure applying member. The side rails of the backing strips are substantially flat and coplanar, and by reinforcing the side rails, the backing strips do not flex appreciably in the concave direction with respect to the surface to be wiped under applied wiper arm pressure.

The pressure applying superstructure, as disclosed, comprises a primary yoke, or holder, having an arm attached connector, and a pair of secondary yokes pivotally connected to the ends of the primary yoke. The primary and secondary yokes are channelled, with the secondary yokes being nested within the primary yoke. The outer end of each secondary yoke is formed with an integral channel extension which overlies the retention portion of the squeegee unit and is spaced therefrom at all times. The secondary yoke extensions terminate just short of the ends of the outer backing strips and function as means for protecting the ends of the outer backing strips from damage during car washing and manual windshield cleaning, etc., and also substantially conceal the outer ends of the retention portions of the squeegee so as to improve the appearance of the blade assembly.

Each secondary yoke has spaced pairs of claws adapted to loosely and slidably straddle the medial portion of a backing strip in the cutouts thereof. In order to facilitate tilting movement of the backing strips about an axis transverse to the wiper blade, the upper, or pressure applying surface of each claw is inclined upwardly at a small angle towards the center of each secondary yoke.

When the wiper blade engages a flat surface under wiper arm pressure, substantially one-fourth of the total arm pressure is exerted against the medial portion of each backing strip. This pressure is sufficient to effect a slight concave flexure of each backing strip thereby causing greater lateral flexing of the wiping lip of the squeegee in the area beneath the connections between the secondary yokes and the backing strips. When the wiper blade engages a surface of convex curvature, under wiper arm pressure, the backing strips will tilt about axes transverse to the wiper blade so as to assume a substantially tangent position to the convexly curved surface. The wiping lip of the squeegee will assume a concave shape to conform with the convexly curved surface by flexing in a direction normal to the surface at the hinge portions between the spaced ends of the backing strips and by the uneven lateral flexing of the wiping lip beneath the connections between the secondary yokes and the backing strips. In other words, the wiping lip bends in and out in a sinuous or serpentine manner throughout the length thereof.

Further objects and advantages of the present invention will be apparent from the following description, reference being had to the accompanying drawings wherein similar reference numerals depict similar parts throughout the several views and wherein a preferred embodiment of the present invention is clearly shown.

In the drawings:

FIGURE 1 is a top view of a wiper blade assembly constructed according to the present invention.

FIGURE 2 is a side view, in elevation, of the windshield wiper blade engaging a flat surface without wiper arm pressure applied thereto.

FIGURE 3 is an enlarged view, in elevation, of a backing strip.

FIGURE 4 is an enlarged fragmentary view, in elevation, of the outer end portion of the blade engaging a surface having convex curvature under wiper arm pressure.

FIGURE 5 is a fragmentary view, partly in section and partly in elevation, depicting the manner in which the wiper blade conforms to a surface of convex curvature.

FIGURES 6 and 7 are enlarged, sectional views taken along lines 6—6 and 7—7, respectively, of FIGURE 5.

With reference to FIGURES 1 through 3, the wiper blade assembly includes a squeegee unit and a pressure applying superstructure. The squeegee unit comprises a freely flexible elongate elastomeric squeegee 14 having a relatively thin wiping lip 16 along one edge and an enlarged retention portion 18 along the opposite edge. The squeegee 14 may be composed of molded natural rubber, and the retention portion 18 is formed with a pair of grooves 20 extending longitudinally throughout the entire length thereof. A second pair of longitudinally extending grooves 22 are formed in the squeegee between the retention portion and the wiping lip, the grooves 22 terminating short of the ends of the squeegee to form reinforced ends 24. The grooves 22 form a reduced neck portion 26 which facilitates flexure of wiping portion of the squeegee relative to the retention portion so that it will assume the proper drag, or squeeging, position as it is moved across a surface to be wiped.

The retention portion 18 is also formed with a pair of laterally extending flanges 28 disposed beneath the grooves 20, the width of the flanges 28 being greater than the claw, or finger, portions of the pressure applying superstructure and at least equal to the width of the backing strip, as seen in FIGURES 6 and 7, so as to prevent engagement of the metal portions of the superstructure and the backing strips with the glass surface being wiped under excessive drag conditions. As seen in FIGURES 2, 3 and 7, a portion of each flange 28 is removed at the connection between the ends of the pressure applying superstructure and the squeegee to form arcuate cutouts 30. Arcuate cutouts 32 are also formed in the upper edge of the retention portion 18 to accommodate the fingers of the pressure applying superstructure, as seen in FIGURE 7.

The squeegee unit also includes four skeletonized substantially rigid backing strips 34 composed of spring tempered stainless steel. As seen in FIGURE 3, each backing strip 34 includes a pair of spaced coplanar side rails 36 of substantially uniform width throughout their lengths, and each side rail 36 has a reinforced rib 38 formed therein. The outer edge of the medial portion of each side rail is formed with a rectangular notch, or cutout, 40 to form interlocking shoulders for receiving the fingers of the pressure applying superstructure. The backing strips 34 are arranged in end to end relation with the side rails disposed in grooves 20, while the adjacent ends of the several backing strips are spaced apart to form freely flexible hinge portions 48.

The ends of the side rails 36 are interconnected by cross straps 42. Each cross strap 42 has a tang portion 44 in alignment with the slot 46 between the side rails, the inner and outer edges of the side rails being parallel. Except for the parallel relationship of the inner and outer edges of the side rails 36 and the ribs 38, the backing strips are the same as the backing strips disclosed in the aforementioned copending application. Thus, the tang 44 on the outer end of each outer backing strip is located at right angles to the rails 36, whereas the tang 44 on both ends of the intermediate backing strips and the inner ends of the outer backing strips lie in a plane parallel to and spaced above the side rails 36 for forming an opening for receiving the retention portion of the squeegee.

As seen in FIGURES 1 through 3, the pressure applying superstructure comprises a channel-shaped primary yoke, or holder, 50 and a pair of channel-shaped secondary yokes 52 pivotally connected at their medial portions to opposite ends of the primary yoke. A suitable wiper arm connector 54 is connected to the center of the primary yoke 50 by a transverse pin 56. The side walls of the channel-shape primary yoke 50 are spaced apart a sufficient distance to nestingly receive the channel-shaped secondary yokes, the secondary yokes being interconnected with the primary yoke by transversely extending pins 58. The pivotal connections between the connector 54 and the primary yoke 50, and the secondary yokes 52 and the primary yoke are of the type shown in the aforementioned copending application.

As seen in FIGURE 1, each secondary yoke 52 is formed with pairs of spaced claws, or fingers, 60 equidistantly spaced from the transverse pivots 58. Accordingly, each pair of fingers 60 will receive substantially one-fourth of the total arm pressure applied to the primary yoke 50. As seen particularly in FIGURE 4, each finger 60 has a substantially rectilinear bottom wall 62 and an inclined upper wall 64. The upper wall is inclined upwardly towards the center of the secondary yoke, and the angle of inclination may be on the order of 5°. The fingers 60 are arranged to straddle the side rails 36 of the backing strips, and when assembled therewith are slidably and loosely connected with the side rails 36 within the notches 40 thereof.

Since pressure is applied to the medial portion of each backing strip, it is readily apparent that any flexure of the backing strips will be opposed to conformance with a convexly curved surface. In other words, while the backing strips are substantially rigid and do not flex appreciably under applied wiper arm pressure of between four and five ounces on each backing strip, due to the weakened portions of the backing strips at the cutouts 40 the backing strips may assume a slight concave shape, or flex in a direction opposite to conformance with a convexly curved surface as seen in FIGURE 4.

The pressure applying superstructure comprising the primary pressure distributing member 50 and the secondary pressure distributing members 52 is assembled with the squeegee unit by pinching the side rails 36 of the backing strips towards each other and hooking the fingers over the cutout portions 40 thereof. The inclined upper surfaces 64 of the fingers permit the backing strips to pivot about a transverse axis relative to the pressure applying superstructure so that when the wiper blade engages a convexly curved surface, the backing strips 34 will lie in a plane substantially tangent to segments of the curved surface. Tilting of the backing strips about an axis transverse of the wiper blade assembly will cause the hinge portions 48 of the squeegee between the spaced ends of the backing strips to flex in a direction normal to the convexly curved surface thereby enabling the wiping lip 16 to assume a concave shape for conformance with the convexly curved surface.

As seen in FIGURES 1, 2 and 4, the outer end of each secondary yoke is formed with an integral channel extension 66 which overlies the outer end portions of the squeegee unit. The extensions 66 are always spaced from the retention portion 18 of the squeegee and serve to conceal the otherwise exposed portion thereof at the ends of the blade and thereby improve the over-all blade appearance. In addition, the extensions, or shields, 66 provide protection for the outer ends of the outer backing strips and the squeegee against damage during washing of the vehicle and manual cleaning of the windshield.

When the wiper blade traverses a flat surface under applied wiper arm pressure substantially one-fourth of the total arm pressure is exerted against the medial portion of each backing strip 36. This pressure is sufficient to effect a slight concave flexure of each backing strip thereby causing greater lateral flexing of the wiping lip 16 of the squeegee in the area beneath the fingers 60. The backing strips 34 distribute the pressure substantially uniformly throughout their entire lengths, and substantially no wiping pressure is applied to the hinge portions 48 of the squeegee between the ends of the backing strips. The uneven lateral flexing of the wiping lip 16 will result in a sinuous or serpentine shape of the feather edge thereof as the wiper blade is moved across the surface to be wiped.

When the wiper blade is moved across a convexly curved surface in the direction of arrow 68 under applied wiper arm pressure as shown in FIGURES 5 through 7, the squeegee bends, or flexes, in a plane normal to the surface at the hinge portions 48. In addition, the inclined upper walls 64 of the fingers 60 permit each backing strip 36 to assume a position substantially tangent to its respective segment of the convexly curved surface. As aforementioned, the backing strips will flex to a slight degree and assume a slight concave shape as seen in FIGURES 4 and 5. Moreover, the wiping lip 16 will be laterally flexed in a sinuous or serpentine manner throughout its length due to the application of pressure at the medial portion of each backing strip. Thus, as clearly shown in FIGURE 5, the wiping lip 16 of the squeegee will be bent in and out throughout the length of the squeegee with the greatest lateral flexure occurring beneath the connections between the secondary yokes and the backing strips as seen in FIGURE 7, and progressively less lateral flexure of the wiping lip 16 towards the ends of the backing strip as seen in FIGURE 6 with the least lateral flexure of the wiping lip beneath the hinge portions 48. The hinge portions 48 are, of course, laterally flexible as well as being flexible normal to the surface to be wiped thereby preventing buckling, or kinking, of the wiping lip beneath these hinge portions.

While the embodiment of the invention as herein disclosed constitutes a preferred form, it is to be understood that other forms might be adopted.

What is claimed is as follows:

1. A windshield wiper blade including, an elongate freely flexible elastomeric squeegee having a wiping lip along one edge and a retention portion along the opposite edge, a plurality of backing strips secured to the retention portion of said squeegee and arranged in end to end relationship with the ends being spaced apart, each backing strip having notched side rails, and a pressure applying superstructure comprising a primary pressure distributing member and a plurality of secondary pressure distributing members having claws at their free ends, said claws being adapted to straddle the notched side rails of said backing strips, each claw having a lower wall and an upper wall with the upper wall inclined with respect to the lower wall whereby said backing strips are supported for tilting movement relative to the secondary pressure distributing members so as to assume a position substantially tangent to a portion of a convexly curved surface to be wiped.

2. A windshield wiper blade including, an elongate freely flexible elastomeric squeegee having a wiping lip along one edge and a retention portion along the opposite edge, a plurality of backing strips secured to the retention portion of the squeegee with the ends thereof being spaced apart to form freely flexible hinge portions therebetween, each backing strip having spaced reinforced side rails so as to resist appreciable flexing in a direction normal to a convexly curved surface to be wiped, and a pressure applying superstructure comprising a plurality of relatively movable members having claw means including spaced upper and lower walls adapted to straddle the side rails of the backing strips, the upper wall of each claw means being inclined with respect to the lower wall to facilitate tilting movement of the backing strips relative to the pressure applying members, said claw means being loosely and slidably connected to the medial portion of each backing strip whereby said backing strips will tilt and assume positions substantially tangent to segments of the convexly curved surfaces being wiped while said hinge portions flex in a direction normal to the convexly curved surface and the wiping lip is laterally flexed in a serpentine manner throughout its length with the greatest lateral flexure of the wiping lip occurring beneath the connections between the pressure applying members and the backing strips.

References Cited in the file of this patent

UNITED STATES PATENTS

| 2,303,694 | Horton | Dec. 1, 1942 |
| 2,634,446 | Mackie et al. | Apr. 14, 1953 |
| 2,739,337 | O'Shei | Mar. 27, 1956 |
| 2,807,821 | Scinta | Oct. 1, 1957 |
| 2,918,688 | O'Shei | Dec. 29, 1959 |
| 2,948,011 | Krohm | Aug. 9, 1960 |
| 2,968,828 | Horton | Jan. 24, 1961 |
| 2,983,945 | De Pew | May 16, 1961 |

FOREIGN PATENTS

| 755,120 | Great Britain | Aug. 15, 1956 |
| 1,222,775 | France | Jan. 25, 1960 |

OTHER REFERENCES

Germany, F 17,814, Dec. 20, 1956.